(12) United States Patent
Nissato

(10) Patent No.: US 9,688,133 B2
(45) Date of Patent: Jun. 27, 2017

(54) CONTROL APPARATUS FOR HYBRID ELECTRIC VEHICLE

(75) Inventor: Yukihiro Nissato, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 13/606,944

(22) Filed: Sep. 7, 2012

(65) Prior Publication Data

US 2013/0066497 A1    Mar. 14, 2013

(30) Foreign Application Priority Data

Sep. 8, 2011   (JP) .................................. 2011-195629

(51) Int. Cl.
   *F02D 29/06*   (2006.01)
   *B60K 6/448*   (2007.10)
   (Continued)

(52) U.S. Cl.
   CPC ............... *B60K 6/448* (2013.01); *B60K 6/52* (2013.01); *B60W 10/06* (2013.01); *B60W 10/08* (2013.01); *B60W 20/13* (2016.01); *B60W 50/06* (2013.01); *B60W 2510/087* (2013.01); *B60W 2510/244* (2013.01); *B60W 2540/106* (2013.01); *Y02T 10/48* (2013.01); *Y02T 10/6243* (2013.01); *Y02T 10/6265* (2013.01); *Y02T 10/6286* (2013.01)

(58) Field of Classification Search
   CPC ............................... H04W 8/005; B60K 6/448
   USPC .......................................................... 701/22
   See application file for complete search history.

(56) References Cited

U.S. PATENT DOCUMENTS 6,018,199 A  *  1/2000  Shiroyama ............. B60K 6/485
                                                       123/179.3
6,137,250 A     10/2000  Hirano et al.
                         (Continued)

FOREIGN PATENT DOCUMENTS

CN       2728830 Y    9/2005
JP       9-200908 A   7/1997
                 (Continued)

OTHER PUBLICATIONS

Japanese Office Action issued on Jul. 23, 2014 in corresponding JP Application No. 2011-195629 with English translation.

*Primary Examiner* — Michael McCullough
*Assistant Examiner* — Michael E Butler
(74) *Attorney, Agent, or Firm* — Birch, Stewart, Kolasch & Birch, LLP

(57) ABSTRACT

A control apparatus for a hybrid electric vehicle, includes: a temperature detector configured to detect a motor temperature of the electric motor; a pressing speed detector configured to detect a pressing speed of an accelerator pedal; an electric current detector configured to detect a value of the electric current supplied to the electric motor from the battery; and an engine controller configured to allow, when the motor temperature detected by the temperature detector is equal to or lower than a threshold temperature, the engine to be started based on the pressing speed detected by the pressing speed detector, so that the generator generates the electric power, and configured to allow, when the motor temperature is higher than the threshold temperature, the engine to be started based on the value of the electric current detected by the electric current detector, so that the generator generates the electric power.

7 Claims, 7 Drawing Sheets

(51) Int. Cl.
*B60K 6/52* (2007.10)
*B60W 10/06* (2006.01)
*B60W 10/08* (2006.01)
*B60W 20/13* (2016.01)
*B60W 50/06* (2006.01)

(56) References Cited

U.S. PATENT DOCUMENTS

| | | | |
|---|---|---|---|
| 2001/0039939 A1* | 11/2001 | Nada | B60K 6/445 123/399 |
| 2003/0098185 A1* | 5/2003 | Komeda et al. | 180/65.2 |
| 2003/0117113 A1 | 6/2003 | Takemasa et al. | |
| 2003/0130772 A1* | 7/2003 | Yanagida et al. | 701/22 |
| 2003/0158647 A1* | 8/2003 | Katakura | B60K 31/04 701/70 |
| 2004/0045751 A1 | 3/2004 | Aoki et al. | |
| 2004/0070353 A1* | 4/2004 | Kayukawa et al. | 318/139 |
| 2004/0108149 A1* | 6/2004 | Adachi et al. | 180/65.2 |
| 2004/0134698 A1* | 7/2004 | Yamamoto et al. | 180/65.2 |
| 2004/0235613 A1* | 11/2004 | Aoki et al. | 477/3 |
| 2004/0255904 A1* | 12/2004 | Izawa | B60K 6/445 123/352 |
| 2005/0052080 A1* | 3/2005 | Maslov et al. | 307/10.1 |
| 2007/0227791 A1* | 10/2007 | Ueno | B60K 6/387 180/65.245 |
| 2007/0265762 A1* | 11/2007 | Suzuki | 701/102 |
| 2008/0076629 A1* | 3/2008 | Sugai et al. | 477/15 |
| 2009/0021198 A1* | 1/2009 | Okamura et al. | 318/400.3 |
| 2009/0088994 A1* | 4/2009 | Machiyama et al. | 702/63 |
| 2009/0093337 A1* | 4/2009 | Soliman et al. | 477/5 |
| 2009/0112432 A1* | 4/2009 | Ueoka | B60T 7/122 701/70 |
| 2009/0118884 A1* | 5/2009 | Heap | 701/22 |
| 2010/0001523 A1* | 1/2010 | Sato et al. | 290/31 |
| 2010/0081541 A1* | 4/2010 | Sugai | 477/5 |
| 2010/0121513 A1* | 5/2010 | Itoh et al. | 701/22 |
| 2010/0198449 A1* | 8/2010 | Ueoka et al. | 701/29 |
| 2011/0110002 A1* | 5/2011 | Ooshima | H02P 7/29 361/33 |
| 2011/0118937 A1* | 5/2011 | Kariatsumari et al. | 701/41 |
| 2011/0193506 A1* | 8/2011 | Hayashi et al. | 318/400.12 |
| 2012/0065819 A1* | 3/2012 | Christman et al. | 701/22 |
| 2012/0188068 A1* | 7/2012 | Hanna et al. | 340/441 |
| 2012/0203417 A1* | 8/2012 | Matsui | 701/22 |
| 2012/0306416 A1* | 12/2012 | Hano | 318/400.26 |
| 2013/0096745 A1* | 4/2013 | Hussain et al. | 701/22 |
| 2013/0311061 A1* | 11/2013 | Ando | 701/102 |

FOREIGN PATENT DOCUMENTS

| | | |
|---|---|---|
| JP | 9-284912 A | 10/1997 |
| JP | 2001-263120 A | 9/2001 |
| JP | 2003-189401 A | 7/2003 |
| JP | 2004-187339 A | 7/2004 |
| JP | 3767103 B2 | 4/2006 |
| JP | 2009-207268 A | 9/2009 |

* cited by examiner

CONTROL APPARATUS FOR HYBRID ELECTRIC VEHICLE

BACKGROUND OF THE INVENTION

The present invention relates to control apparatuses for hybrid electric vehicles.

Examples of known hybrid electric vehicles include one in which an electric current is supplied to a motor from each of a battery and a generator driven by an engine, and a driving wheel is driven by driving torque outputted from the motor.

For such a hybrid electric vehicle, there is proposed a technique (related art) in which when an accelerator pedal pressing speed is equal to or higher than a given value, an electric current generated by a generator by starting an engine is added to an electric current supplied from a battery, and the resulting electric current is supplied to a motor, thereby sharply increasing driving torque in response to a sudden accelerator pedal pressing operation (see Japanese Patent No. 3767103).

Thus, a rush current flowing into the motor from the battery is suppressed, thereby reducing the load on the battery and ensuring responsiveness of driving torque outputted from the motor.

However, in the above related art, there is apprehension that the larger the number of times the engine is started by sudden accelerator pedal pressing, the lower the fuel efficiency will be.

In fact, it is known that the lower the motor coil temperature (the motor temperature), the larger the rush current flowing into the motor from the battery, and the higher the motor coil temperature, the smaller the rush current.

Therefore, when the motor coil temperature is low, the engine is preferably started at an early stage to supply an electric current to the motor from the generator, thereby suppressing the rush current.

However, when the motor coil temperature is high, the rush current is originally small, thus reducing the necessity for starting the engine at an early stage to suppress the rush current.

SUMMARY

This invention provides a control apparatus for a hybrid electric vehicle, which is advantageous in suppressing fuel consumption while ensuring responsiveness of driving torque by starting an engine in consideration of a motor coil temperature.

An aspect of the invention provides a control apparatus for a hybrid electric vehicle comprising: an electric motor configured to drive a driving wheel of the hybrid electric vehicle; a battery configured to supply an electric current to the electric motor; a generator configured to supply an electric current to the electric motor; and an engine configured to allow the generator to generate electric power, the control apparatus comprising: a temperature detector configured to detect a motor temperature of the electric motor; a pressing speed detector configured to detect a pressing speed of an accelerator pedal; an electric current detector configured to detect a value of the electric current supplied to the electric motor from the battery; and an engine controller configured to allow, when the motor temperature detected by the temperature detector is equal to or lower than a threshold temperature, the engine to be started based on the pressing speed detected by the pressing speed detector, so that the generator generates the electric power, and configured to allow, when the motor temperature is higher than the threshold temperature, the engine to be started based on the value of the electric current detected by the electric current detector, so that the generator generates the electric power.

The control apparatus may further comprise a threshold temperature setter configured to set the threshold temperature so that the lower a temperature of the battery, the lower the threshold temperature.

The control apparatus may further comprise a threshold temperature setter configured to set the threshold temperature so that the lower state of charge of the battery, the lower the threshold temperature.

The control apparatus may further comprise a threshold temperature setter configured to set the threshold temperature so that the longer a continuous energization time that is a period of time during which the electric current is continuously supplied to the electric motor from the battery, the lower the threshold temperature.

The motor temperature may include a temperature of a coil of the electric motor.

DETAILED DESCRIPTION OF EMBODIMENTS

Hereinafter, an embodiment of the present invention will be described with reference to the drawings.

Figure 1:
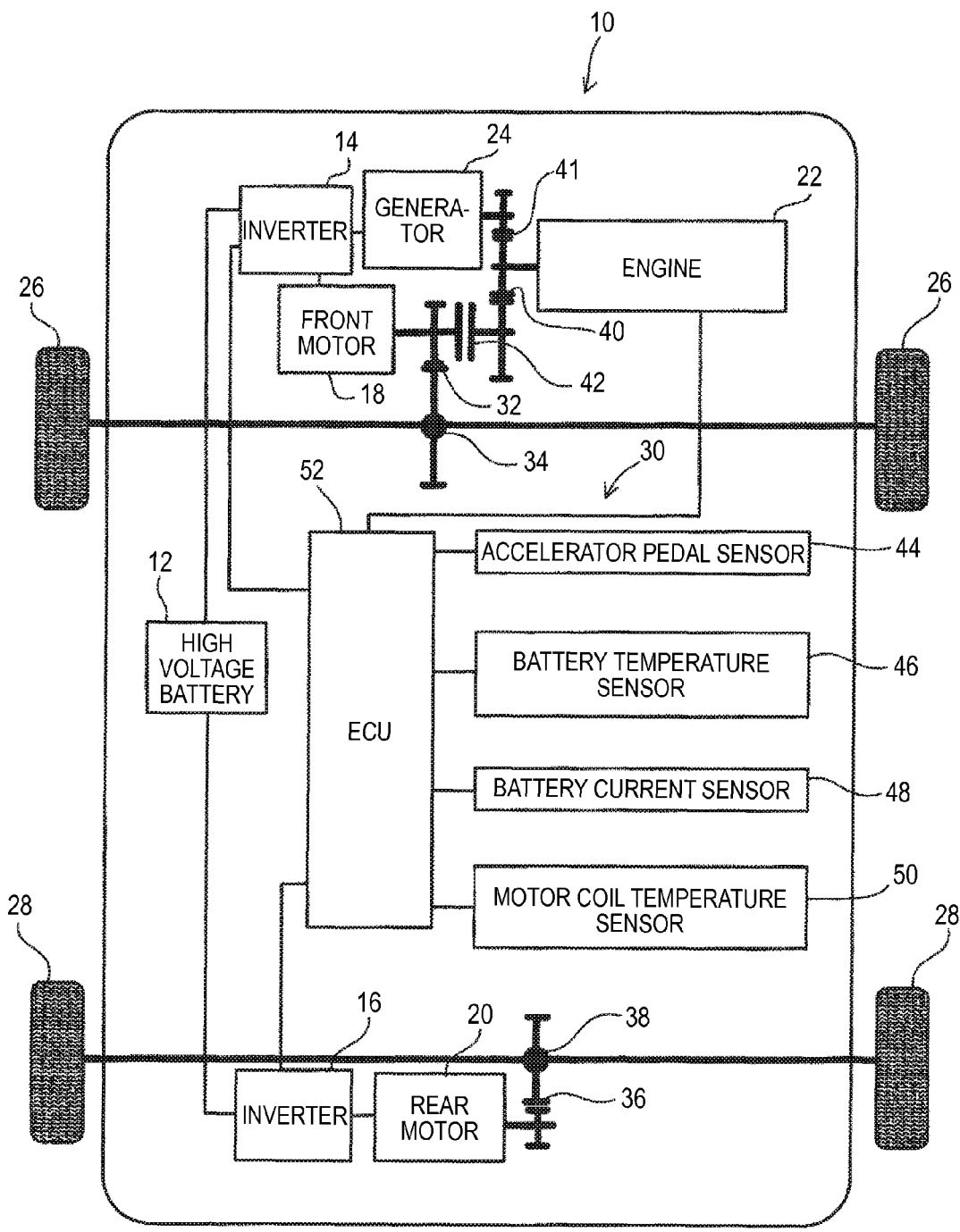
FIG. 1 is a block diagram illustrating an overall configuration of a vehicle 10 on which a control apparatus 30 according to an embodiment of the present invention is installed.

As illustrated in FIG. 1, the vehicle 10 includes: a high voltage battery 12; inverters 14 and 16; a front motor 18 serving as an electric motor; a rear motor 20 serving as an electric motor; an engine 22 serving as an internal combustion engine; a generator 24; front wheels 26; rear wheels 28; and a control apparatus 30 according to the present invention.

Accordingly, the vehicle 10 constitutes a hybrid electric vehicle on which the motors 18 and 20 and the engine 22 are installed.

The high voltage battery 12 supplies electric power to the front and rear motors 18 and 20. Further, an electric current, supplied from the high voltage battery 12 to the front and rear motors 18 and 20, will herein be referred to as a "battery current".

Note that the high voltage battery 12 is charged with electric power supplied from, for example, a domestic commercial power supply or a quick-charging power supply of a charging station via unillustrated charging equipment.

The inverters 14 and 16 convert DC electric power, supplied from the high voltage battery 12, into three-phase AC electric power, and supply the three-phase AC electric power to the front and rear motors 18 and 20, respectively.

Based on control performed by an ECU 52 described later, the three-phase AC electric power, which is supplied to the front and rear motors 18 and 20, is controlled by the inverters 14 and 16 by using PWM (pulse width modulation), for example, thereby controlling driving torque outputted from the front and rear motors 18 and 20.

The front motor 18 is driven and rotated by the AC electric power supplied from the inverter 14, and provides power (driving torque) to the front wheels 26 via a speed reducer 32 and a differential gear 34, thereby driving the front wheels 26.

The rear motor 20 is driven and rotated by the three-phase AC electric power supplied from the inverter 16, and provides power (driving torque) to the rear wheels 28 via a speed reducer 36 and a differential gear 38, thereby driving the rear wheels 28.

Furthermore, when regenerative braking of the vehicle 10 is performed, the front and rear motors 18 and 20 each function as a generator, and three-phase AC electric power generated by the front and rear motors 18 and 20 is converted into DC electric power via the inverters 14 and 16; then, the high voltage battery 12 is charged with the DC electric power.

The motors 18 and 20 each incorporate a motor coil, and are each driven and rotated by an electric current (battery current) flowing through its motor coil.

The motors 18 and 20 have characteristics that simultaneously with start of supply of an electric current, a transient large electric current, which is called a "rush current", temporarily flows through the motors 18 and 20.

The lower the motor coil temperature, the larger the rush current, and the higher the motor coil temperature, the smaller the rush current.

The engine 22 is connected to the speed reducer 32 via a speed reducer 40 and a clutch 42. Engagement and disengagement of the clutch 42 is controlled by the ECU.

When the clutch 42 is in a disengaged state, the engine 22 provides power to the generator 24 via a speed reducer 41 and thus drives the generator 24.

The generator 24 generates electric power by the power supplied from the engine 22, and charges the high voltage battery 12 via the inverter 14.

Note that in a state where the battery current is supplied to the front motor 18 (and/or the rear motor 20) from the high voltage battery 12 and thus the front motor 18 (and/or the rear motor 20) are/is driven, the engine 22 is started to allow the generator 24 to generate electric power; then, the electric power (electric current) generated by the generator 24 is supplied to the front motor 18 (and/or the rear motor 20), and in addition, the high voltage battery 12 is charged with electric power (electric current) that has not been consumed by driving of the front motor 18 (and/or the rear motor 20). In other words, the electric current supplied from the generator 24 is added to the battery current supplied from the high voltage battery 12, and the resulting electric current is supplied to the front motor 18 and/or the rear motor 20.

Moreover, for the sake of simplification, the following description will be made on a case where the vehicle 10 travels by using only the front motor 18. However, the present invention is also naturally applicable to a case where the vehicle 10 travels by using only the rear motor 20, or a case where the vehicle 10 travels by using both of the front and rear motors 18 and 20.

Note that the present embodiment will be described on the assumption that when the clutch 42 is in the disengaged state, the engine 22 provides power to the generator 24 via the speed reducer 41 and thus drives the generator 24.

However, the present invention is also naturally applicable to a case where when the clutch 42 is in the engaged state, the engine 22 provides power to the generator 24 via the speed reducer 41 and thus drives the generator 24, while the engine 22 provides power (driving torque) to the front wheels 26 via the speed reducer 40, the clutch 42, the speed reducer 32 and the differential gear 34 and thus drives the front wheels 26.

The control apparatus 30 includes: an accelerator pedal sensor 44; a battery temperature sensor 46; a battery current sensor 48; a motor coil temperature sensor 50; and the ECU 52.

The accelerator pedal sensor 44 detects an accelerator pedal pressing amount, and supplies the detected value to the ECU 52.

The battery temperature sensor 46 detects a temperature of the high voltage battery 12, and supplies the detected value to the ECU 52.

The battery current sensor 48 detects a value of the electric current supplied to the front motor 18 from the high voltage battery 12, and supplies the detected value to the ECU 52. In the present embodiment, the battery current sensor 48 constitutes an "electric current detector".

The motor coil temperature sensor 50 detects a temperature of the coil of the front motor 18, and supplies the detected value to the ECU 52. In the present embodiment, the motor coil temperature sensor 50 constitutes a "temperature detector".

The ECU 52 includes: a CPU; a ROM for storing/retaining a control program or the like; a RAM serving as an area where the control program is operated; and an interface section serving as an interface between the ECU 52 and a peripheral circuit or the like.

Figure 2:
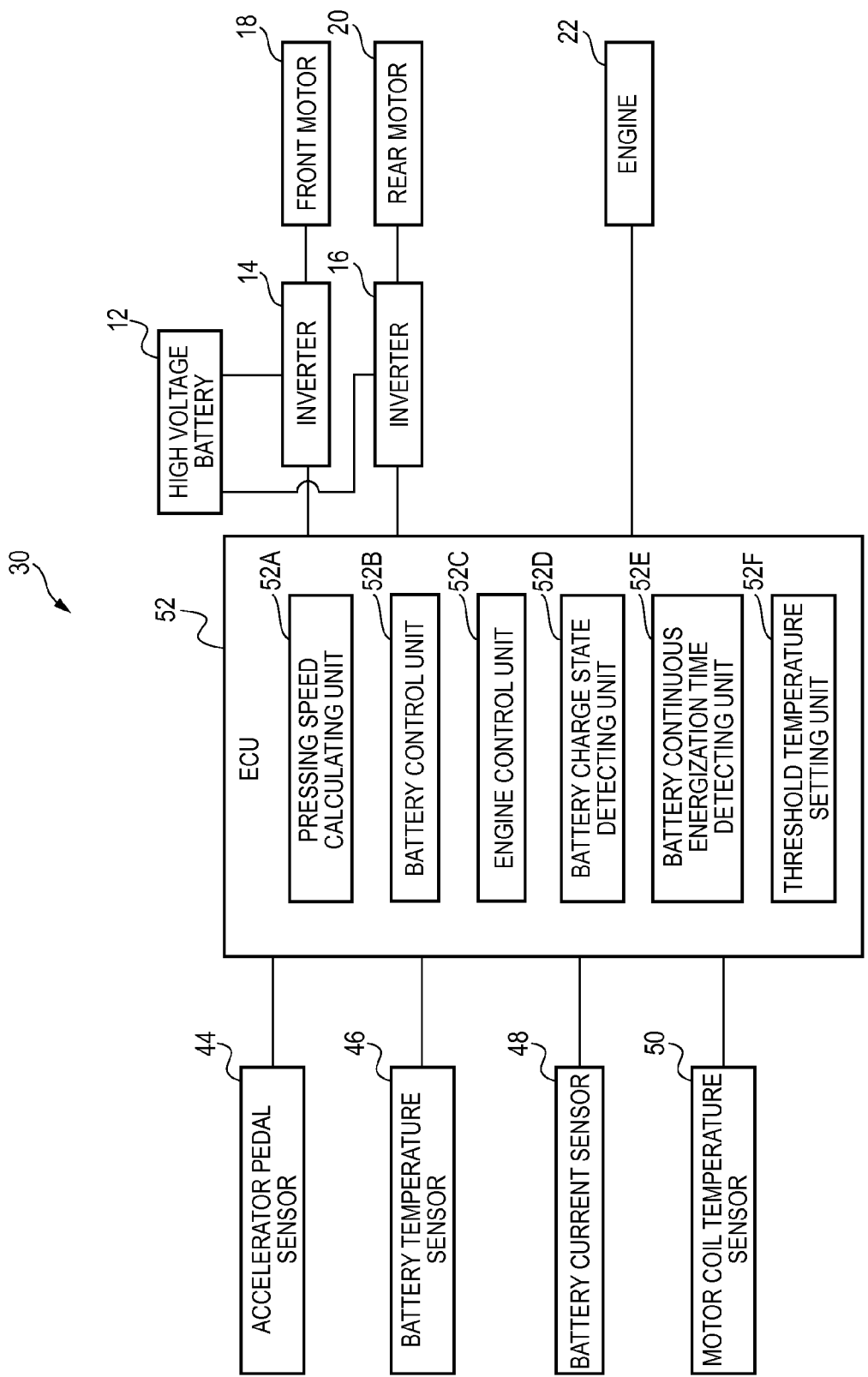
FIG. 2 is a functional block diagram illustrating a configuration of the control apparatus 30.

As illustrated in FIG. 2, the ECU 52 executes the control program, thereby implementing: a pressing speed calculating unit 52A; a battery control unit 52B; an engine control unit 52C; a battery charge state detecting unit 52D; a battery continuous energization time detecting unit 52E; and a threshold temperature setting unit 52F.

The pressing speed calculating unit 52A calculates an accelerator pedal pressing speed that is a change in the accelerator pedal pressing amount per unit time, which is supplied from the accelerator pedal sensor 44.

Figure 3:
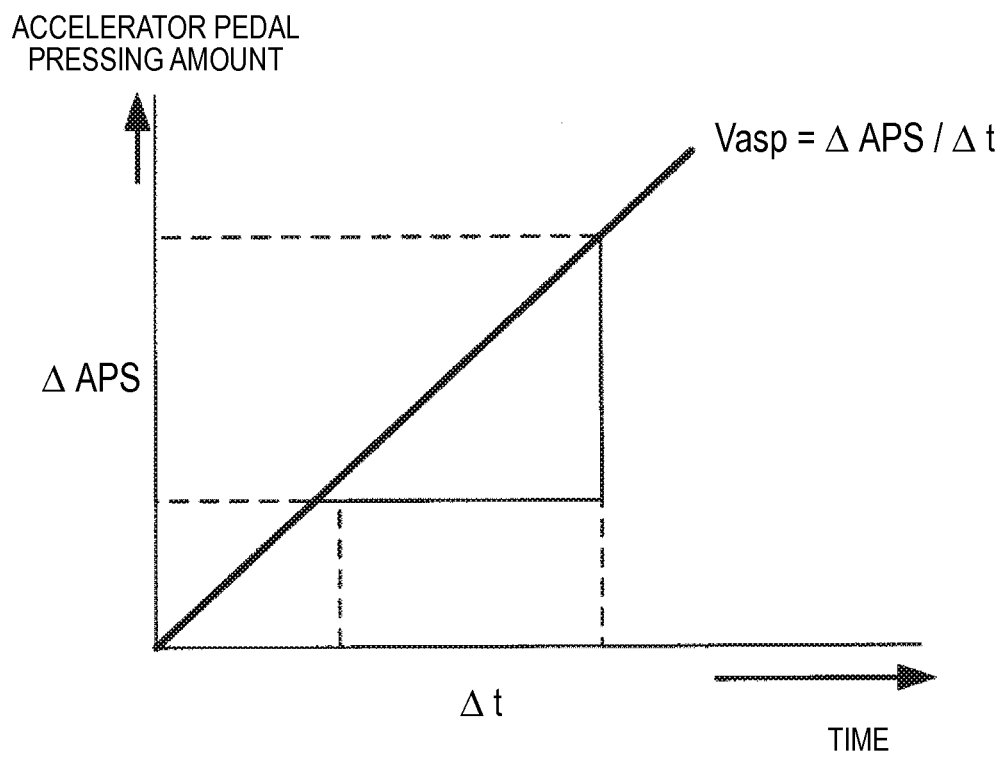
FIG. 3 is an explanatory graph illustrating definition of an accelerator pedal pressing speed Vaps.

In other words, as illustrated in FIG. 3, when the accelerator pedal pressing amount per unit time $\Delta t$ is $\Delta APS$, a pressing speed Vaps is defined by $\Delta APS/\Delta t$.

In the present embodiment, the accelerator pedal sensor 44 and the pressing speed calculating unit 52A constitute a "pressing speed detector".

The battery control unit 52B controls the electric current, supplied to the front motor 18 from the high voltage battery 12, in accordance with the accelerator pedal pressing amount detected by the accelerator pedal sensor 44, i.e., in accordance with the required driving torque.

Further, the battery control unit 52B performs control for suppressing the electric current, supplied to the front motor 18 from the high voltage battery 12, so that an excessive rush current will not be supplied to the front motor 18 from the high voltage battery 12.

The rush current is suppressed in this manner, thus preventing degradation in the high voltage battery 12.

The engine control unit 52C controls, for example, the start, stop and RPM of the engine 22. When the coil temperature detected by the motor coil temperature sensor 50 is equal to or lower than the preset threshold temperature Tr and the pressing speed Vaps detected by the pressing speed detector is equal to or higher than a preset threshold speed Vr, the engine control unit 52C starts the engine 22.

Note that an accelerator pedal is suddenly pressed by a driver when the driving torque of the front motor 18 has to be suddenly increased. For example, the accelerator pedal is suddenly pressed by the driver when the vehicle 10 overtakes a vehicle in front of the vehicle 10, or when the vehicle 10 is accelerated or started on an uphill road.

Furthermore, when the coil temperature is higher than the threshold temperature Tr and the current value detected by the battery current sensor 48 is equal to or higher than a preset threshold current Ir, the engine control unit 52C starts the engine 22.

The battery charge state detecting unit 52D detects a state of charge (SOC) of the high voltage battery 12. The state of charge (SOC) indicates, on a percentage (%) basis, the ratio of the remaining charge amount to a battery capacity at the time of full charge.

The state of charge of the high voltage battery 12 is detected by the battery charge state detecting unit 52D, for example, by acquiring information of the state of charge from a battery monitoring ECU of a related art, which monitors the state of the high voltage battery 12.

The battery continuous energization time detecting unit 52E detects a continuous energization time that is a period of time during which the battery current is continuously supplied to the front motor 18 from the high voltage battery 12.

The continuous energization time is detected by the battery continuous energization time detecting unit 52E based on a detection result obtained by the battery current sensor 48, for example.

The threshold temperature setting unit 52F sets the threshold temperature Tr.

In the present embodiment, the threshold temperature setting unit 52F sets the threshold temperature Tr so as to satisfy the following three requirements.

(1) The threshold temperature Tr is set so that the lower the temperature TB of the high voltage battery 12 detected by the battery temperature sensor 46, the lower the threshold temperature Tr.

(2) The threshold temperature Tr is set so that the lower the state of charge (SOC) of the high voltage battery 12 detected by the battery charge state detecting unit 52D, the lower the threshold temperature Tr.

(3) The threshold temperature Tr is set so that the longer the continuous energization time detected by the battery continuous energization time detecting unit 52E, the lower the threshold temperature Tr.

Figure 4:
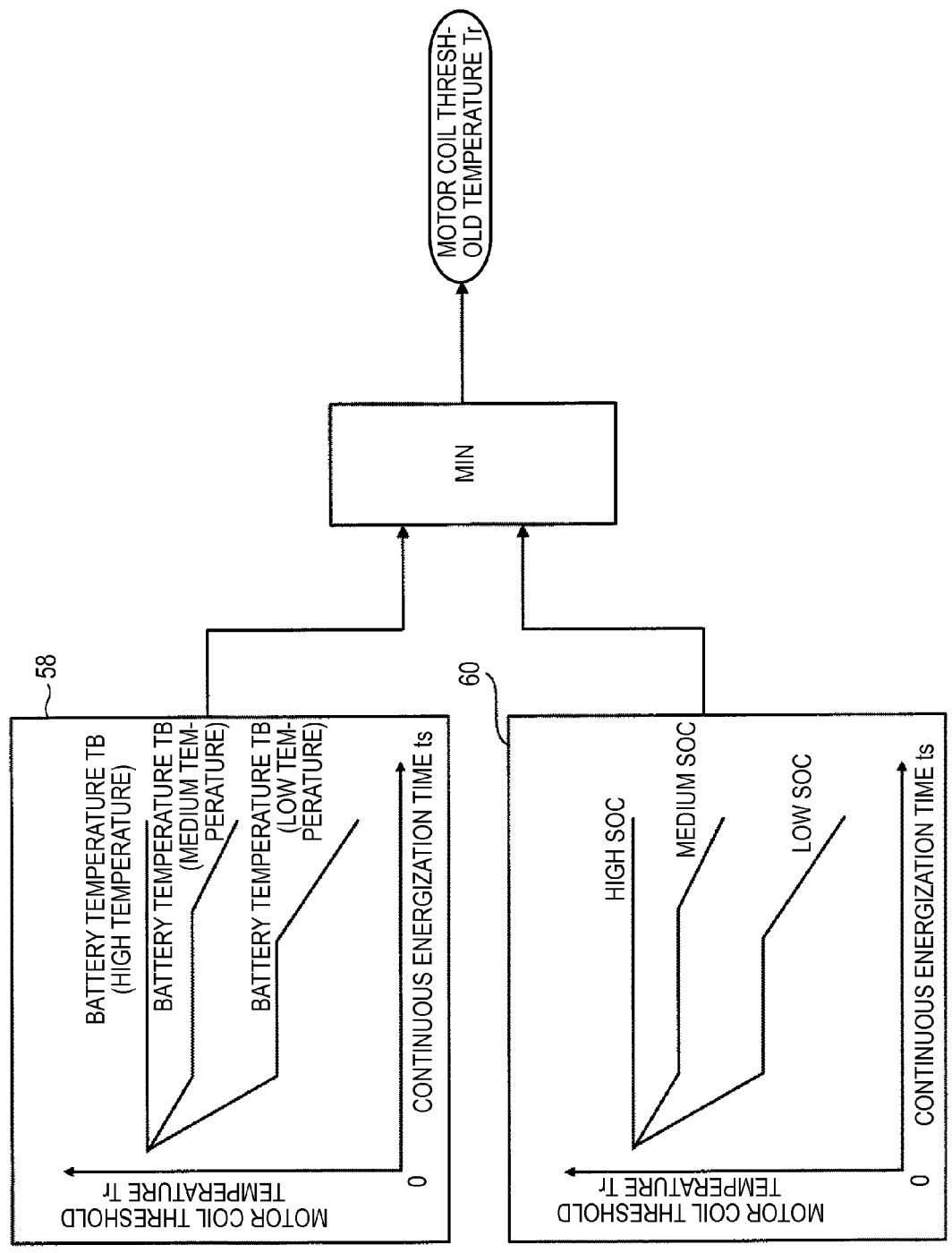
FIG. 4 is an explanatory diagram illustrating an operation for setting a threshold temperature Tr by a threshold temperature setting unit 52F.

FIG. 4 is an explanatory diagram illustrating an operation for setting the threshold temperature Tr by the threshold temperature setting unit 52F.

As illustrated in FIG. 4, the threshold temperature setting unit 52F includes a first map 58 and a second map 60.

The first map 58 is a map indicating a relationship between a continuous energization time is of the high voltage battery 12 and the threshold temperature Tr for each battery temperature TB of the high voltage battery 12.

The first map 58 represents the requirements (1) and (3).

In FIG. 4, the first map 58 illustrates a case where the battery temperature TB is divided into three regions (high temperature, medium temperature and low temperature regions). For example, the high temperature region is defined as a region where the battery temperature TB is equal to or higher than a temperature T1, the medium temperature region is defined as a region where the battery temperature TB is not lower than T2 but lower than T1 (note that T2<T1), and the low temperature region is defined as a region where the temperature TB is lower than T2. It is to be noted that the battery temperature TB may naturally be divided into two regions, or four or more regions.

The second map 60 is a map indicating a relationship between the continuous energization time is of the high voltage battery 12 and the threshold temperature Tr for each state of charge (SOC) of the high voltage battery 12.

The second map 60 represents the requirements (2) and (3).

In FIG. 4, the second map 60 illustrates a case where the state of charge (SOC) of the high voltage battery 12 is divided into three regions (high SOC, medium SOC and low SOC regions). For example, the high SOC region is defined as a region where the SOC is equal to or higher than SOC1, the medium SOC region is defined as a region where the SOC is not lower than SOC2 but lower than SOC1 (note that SOC2<SOC1), and the low SOC region is defined as a region where the SOC is lower than SOC2. It is to be noted that the state of charge (SOC) of the high voltage battery 12 may naturally be divided into two regions, or four or more regions.

In the present embodiment, the threshold temperature setting unit 52F makes a comparison between: a value of the threshold temperature Tr determined from the continuous energization time ts and the battery temperature TB based on the first map 58; and a value of the threshold temperature Tr determined from the continuous energization time ts and the state of charge (SOC) based on the second map 60, and sets the lower value as the threshold temperature Tr.

Next, operations of the control apparatus 30 will be described with reference to a flow chart of FIG. 5.

Figure 5:
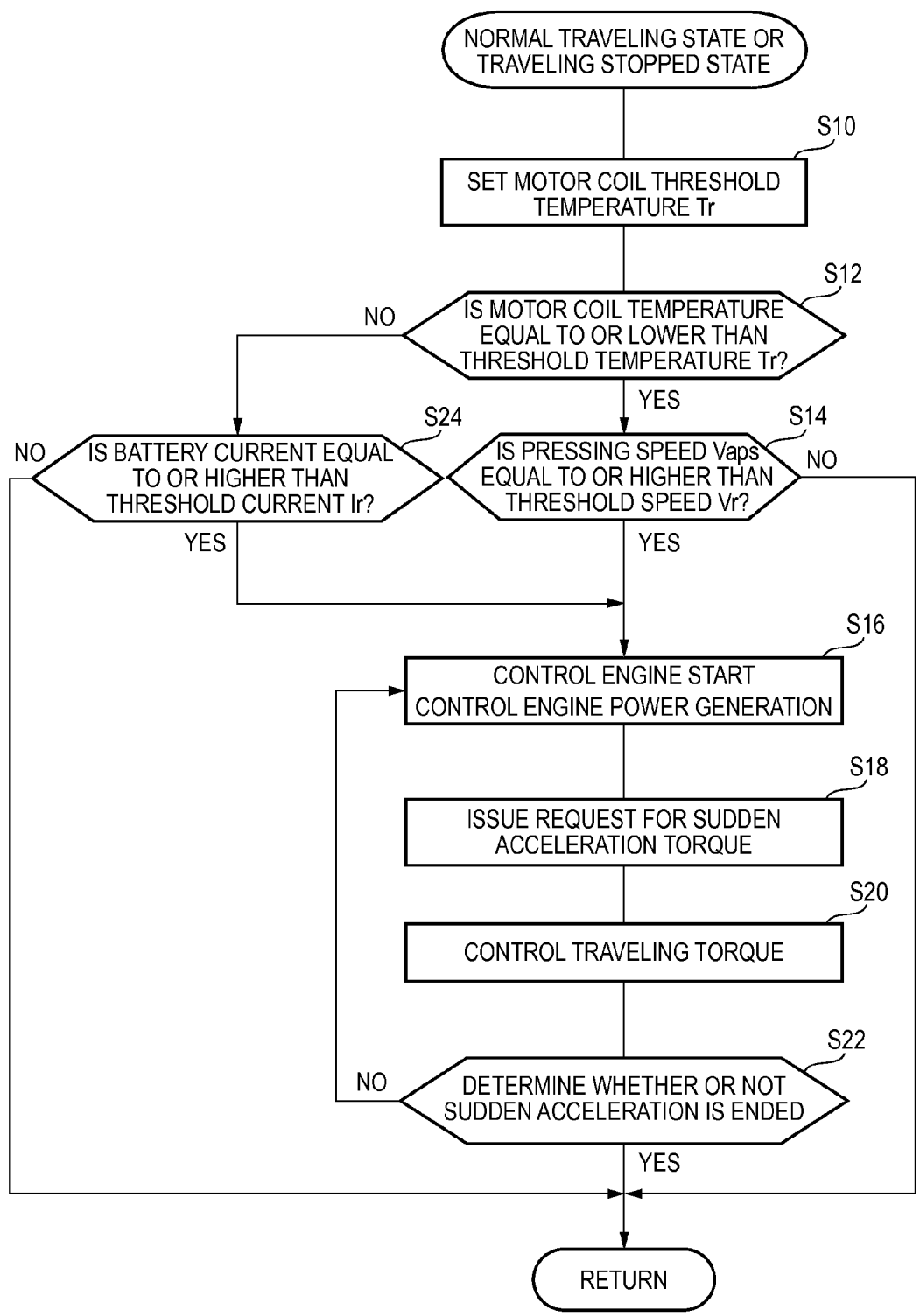
FIG. 5 is a main flow chart illustrating operations of the control apparatus 30.

The ECU 52 repeatedly executes processing of FIG. 5 when the vehicle 10 is in a normal traveling state in which the vehicle 10 travels by using the front motor 18, or when the vehicle 10 is in a traveling stopped state in which the normal running of the vehicle 10 is temporarily stopped.

The ECU 52 (threshold temperature setting unit 52F) calculates and sets the threshold temperature Tr based on: the battery temperature TB detected by the battery temperature sensor 46; the continuous energization time ts detected by the battery continuous energization time detecting unit 52E; and the state of charge (SOC) detected by the battery charge state detecting unit 52D (Step S10).

Subsequently, the ECU 52 (engine control unit 52C) determines whether or not the motor coil temperature detected by the motor coil temperature sensor 50 is equal to or lower than the threshold temperature Tr (Step S12).

When the answer is YES in Step S12, the ECU 52 (engine control unit 52C) determines whether or not the pressing speed Vaps ($\Delta APS/\Delta t$) calculated by the pressing speed calculating unit 52A is equal to or higher than the preset threshold speed Vr, i.e., whether or not the accelerator pedal is suddenly pressed (Step S14).

When the answer is NO in Step S14, it is determined that the accelerator pedal is not suddenly pressed, and therefore, a series of the processes is ended (returned).

When the answer is YES in Step S14, it is determined that the accelerator pedal is suddenly pressed, and therefore, the ECU 52 (engine control unit 52C) starts the engine 22 to allow the generator 24 to generate electric power (Step S16). Thus, the electric current supplied from the generator 24 is added to the electric current supplied from the high voltage battery 12, and the resulting electric current is supplied to the front motor 18.

In other words, when the coil temperature is equal to or lower than the threshold temperature Tr, the engine 22 is started based on the pressing speed Vaps, so that the generator 24 generates electric power.

Upon determination that the pressing speed Vaps (ΔAPS/Δt) is equal to or higher than the threshold speed Vr, the ECU 52 issues a request for a sharp increase in driving torque to the front motor 18 via the inverter 14, thereby controlling traveling torque (Steps S18 and S20). Thus, the driving torque of the front motor 18 is sharply increased (in other words, sudden acceleration is performed).

The ECU 52 determines whether or not sudden acceleration is ended (Step S22). The ECU 52 determines whether or not sudden acceleration is ended based on the accelerator pedal pressing speed Vaps, vehicle speed and driving torque, for example.

When the answer is YES in Step S22, the processing is ended (returned), and when the answer is NO in Step S22, the processing goes back to Step S16.

On the other hand, when the answer is NO in Step S12, the ECU 52 (engine control unit 52C) determines whether or not the value of the electric current, flowing from the high voltage battery 12 and detected by the battery current sensor 48, is equal to or higher than the preset threshold current Ir (Step S24).

When the answer is YES in Step S24, it is determined that the accelerator pedal is suddenly pressed, and therefore, the processing goes to Step S16 to perform the processes similar to those mentioned above.

Specifically, when the coil temperature is higher than the threshold temperature Tr, the engine 22 is started based on the value of the electric current supplied to the front motor 18 from the high voltage battery 12, so that the generator 24 generates electric power.

When the answer is NO in Step S24, it is determined that the accelerator pedal is not suddenly pressed, and therefore, the processing is ended (returned).

Next, operations and effects of the present embodiment will be described with reference to FIG. 5 to FIGS. 7A and 7B.

The following description will be made on the battery current flowing from the high voltage battery 12, generated electric current generated by the generator 24, torque of the front motor 18, and start timing of the engine 22 when the accelerator pedal is suddenly pressed by the driver.

First, for the sake of clarity, a comparative example in which the engine 22 is started when an accelerator pedal pressing amount becomes equal to or higher than a preset threshold value will be described with reference to FIG. 6.

Figure 6:
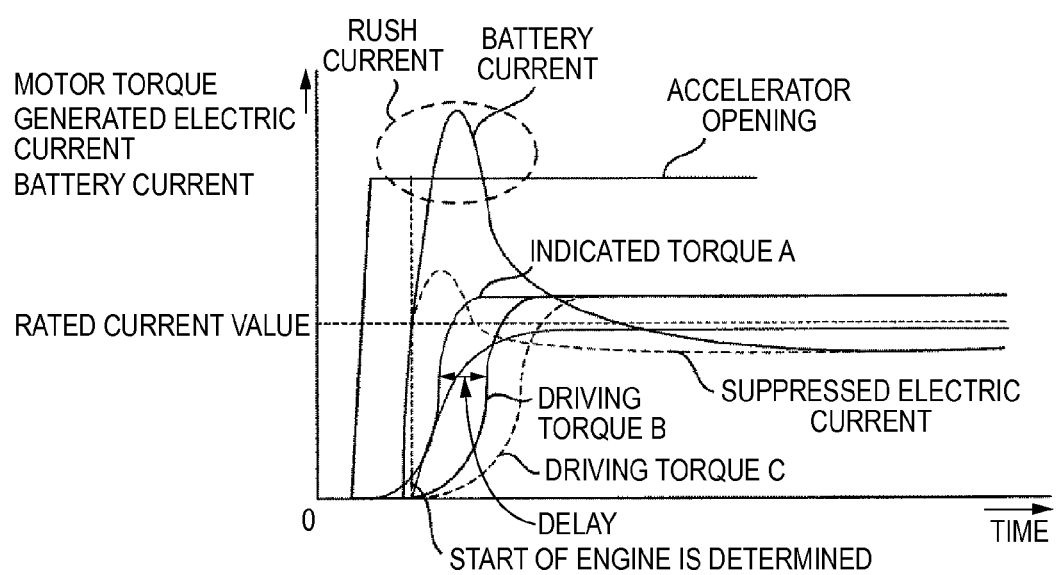
FIG. 6 is an explanatory graph illustrating electric current, torque and start timing of an engine 22 obtained upon sudden pressing of an accelerator pedal by a driver in a comparative example.

As illustrated in FIG. 6, upon sudden pressing of the accelerator pedal, the engine 22 is started at the instant when the accelerator pedal pressing amount becomes higher than the preset value, and the generated electric current is generated by the generator 24.

At this time, the coil temperature of the motor is low; hence, when the battery current supplied to the front motor 18 from the high voltage battery 12 is not limited, a large rush current will be generated as illustrated in FIG. 6.

Therefore, the ECU 52 performs control for suppressing the battery current of the high voltage battery 12 to a suppressed current lower than the rush current (note that the suppressed current is indicated by the broken line in FIG. 6).

Note that a rated current value in FIG. 6 indicates a maximum value of the battery current, which can prevent degradation in the high voltage battery 12. Accordingly, the control is performed so that the suppressed current becomes equal to or lower than the rated current value.

In this case, if the rush current is supplied to the front motor 18 without being suppressed, a driving torque B produced by the front motor 18 is delayed by a given period of time with respect to an indicated torque A corresponding to the accelerator pedal pressing amount.

Actually, the generated electric current generated by the generator 24 is added to the suppressed current suppressed to be lower than the rush current, and the resulting electric current is supplied to the front motor 18.

However, the suppressed current is lower than the rush current, and in addition, the generated electric current rises after the start of the engine 22; hence, the electric current supplied to the front motor 18 is delayed. As a result, a driving torque C produced by the front motor 18 is further delayed with respect to the driving torque B.

As described above, the start timing of the engine 22 is delayed with respect to sudden pressing of the accelerator pedal, and therefore, the responsiveness of driving torque of the front motor 18 remains at a low level.

Next, referring to FIGS. 7A and 7B, the electric current, torque and start timing of the engine 22 when the accelerator pedal is suddenly pressed by the driver will be described on the assumption that the control apparatus 30 according to the present invention is used.

Figure 7A:
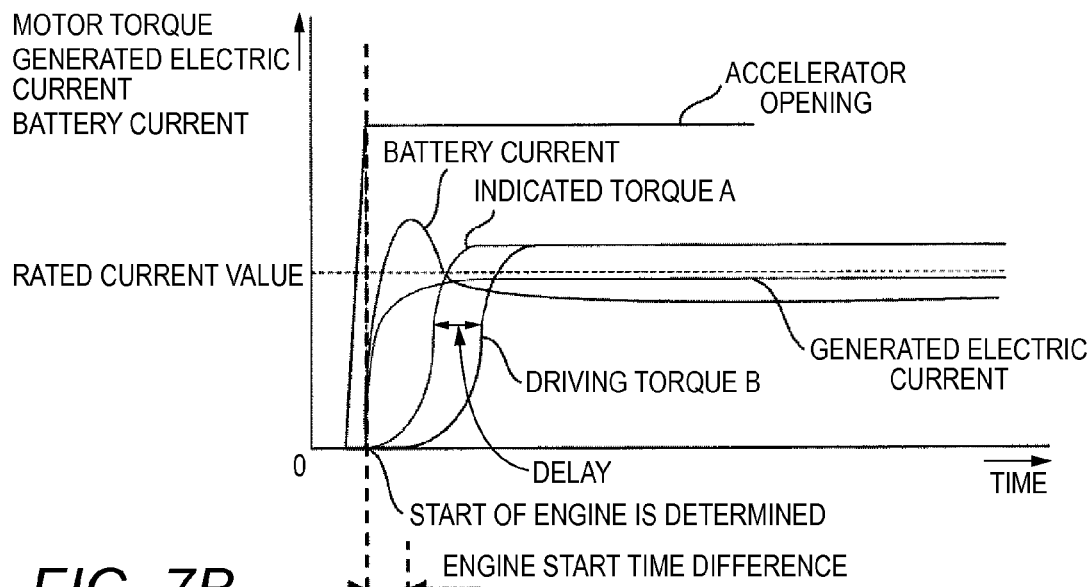
FIG. 7A is an explanatory graph illustrating electric current, torque and start timing of the engine 22 obtained upon sudden pressing of the accelerator pedal by the driver when a motor coil temperature is equal to or lower than the threshold temperature Tr.
Figure 7B:
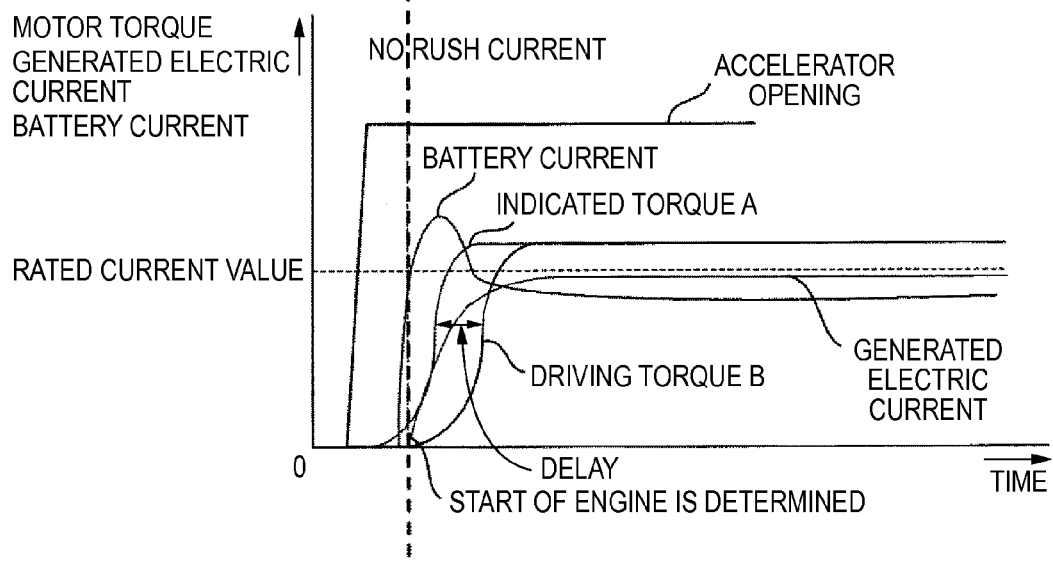
FIG. 7B is an explanatory graph illustrating electric current, torque and start timing of the engine 22 obtained upon sudden pressing of the accelerator pedal by the driver when the motor coil temperature is higher than the threshold temperature Tr.

FIG. 7A illustrates an example in which the motor coil temperature is equal to or lower than the threshold temperature Tr, and FIG. 7B illustrates an example in which the motor coil temperature is higher than the threshold temperature Tr.

As illustrated in FIG. 7A, when the motor coil temperature is equal to or lower than the threshold temperature Tr, the example of FIG. 7A is similar to the comparative example of FIG. 6 in that the battery current, supplied to the front motor 18 from the high voltage battery 12, is suppressed to the suppressed electric current.

However, when the motor coil temperature is equal to or lower than the threshold temperature Tr, the engine 22 is started upon determination that the accelerator pedal pressing speed Vaps is equal to or higher than the threshold speed Vr, as illustrated in Steps S12, S14 and S16 of FIG. 5 and FIG. 7A. In other words, the engine 22 is started earlier compared with the comparative example of FIG. 6.

Accordingly, the generated electric current generated by the generator 24 is added to the suppressed electric current and the resulting electric current is supplied to the front motor 18 at an early stage; hence, the delay of the driving torque B, produced by the front motor 18, with respect to the indicated torque A can be minimized, which is advantageous in terms of improving the responsiveness of the driving torque to an operation performed on the accelerator pedal.

On the other hand, as illustrated in FIG. 7B, when the motor coil temperature is higher than the threshold temperature Tr, the battery current supplied to the front motor 18 from the high voltage battery 12 is low and no rush current is generated, thus eliminating the necessity to suppress the battery current.

Therefore, when the motor coil temperature is higher than the threshold temperature Tr, the engine 22 is started upon determination that the value of the electric current, flowing from the high voltage battery 12 and detected by the battery current sensor 48, is equal to or higher than the preset threshold current Ir, as illustrated in Steps S12, S24 and S16 of FIG. 5 and FIG. 7B.

In other words, at the instant when the battery current, which is increased in accordance with the accelerator pedal pressing amount, becomes equal to or higher than the threshold current Ir, the generated electric current generated by the generator 24 is added to the suppressed electric current, and the resulting electric current is supplied to the front motor 18.

Accordingly, the instant when the battery current becomes equal to or higher than the threshold current Ir in FIG. 7B is delayed with respect to the instant when the accelerator pedal pressing speed Vaps becomes equal to or higher than the threshold speed Vr in FIG. 7A, and therefore, the start timing of the engine 22 in FIG. 7B is delayed with respect to that of the engine 22 in FIG. 7A.

Hence, the engine 22 is not started at an unnecessarily early stage while the delay of the driving torque B, produced by the front motor 18, with respect to the indicated torque A is minimized; consequently, the responsiveness of the driving torque to an operation performed on the accelerator pedal can be improved, and in addition, fuel efficiency can be enhanced.

Note that there is a tendency that the lower the temperature TB of the high voltage battery 12, the lower the battery current that can be outputted from the high voltage battery 12; therefore, as the temperature TB of the high voltage battery 12 is reduced, the engine 22 is started earlier, which is advantageous in terms of improving the responsiveness of the driving torque to an operation performed on the accelerator pedal.

Hence, in the present embodiment, as the temperature TB of the high voltage battery 12 is reduced, the motor coil threshold temperature Tr is reduced, thus determining the start of the engine 22 on a priority basis based on the accelerator pedal pressing speed Vaps.

As a result, even in a situation where the temperature TB of the high voltage battery 12 is reduced and the electric current that can be supplied from the high voltage battery 12 is reduced, the present invention is advantageous in terms of ensuring the responsiveness of the driving torque to an operation performed on the accelerator pedal.

Further, there is a tendency that the lower the state of charge (SOC) of the high voltage battery 12, the lower the battery current that can be outputted from the high voltage battery 12; therefore, as the state of charge (SOC) of the high voltage battery 12 is reduced, the engine 22 is started earlier, which is advantageous in terms of improving the responsiveness of the driving torque to an operation performed on the accelerator pedal.

Hence, in the present embodiment, as the state of charge (SOC) of the high voltage battery 12 is reduced, the motor coil threshold temperature Tr is reduced, thus determining the start of the engine 22 on a priority basis based on the accelerator pedal pressing speed.

As a result, even in a situation where the state of charge (SOC) of the high voltage battery 12 is reduced and the electric current that can be supplied from the high voltage battery 12 is reduced, the present invention is advantageous in terms of ensuring the responsiveness of the driving torque to an operation performed on the accelerator pedal.

Furthermore, there is a tendency that the longer the continuous energization time of the high voltage battery 12, the lower the battery current that can be outputted from the high voltage battery 12; therefore, as the continuous energization time of the high voltage battery 12 is prolonged, the engine 22 is started earlier, which is advantageous in terms of improving the responsiveness of the driving torque to an operation performed on the accelerator pedal.

Hence, in the present embodiment, as the continuous energization time of the high voltage battery 12 is prolonged, the motor coil threshold temperature Tr is reduced, thus determining the start of the engine 22 on a priority basis based on the accelerator pedal pressing speed.

As a result, even in a situation where the continuous energization time of the high voltage battery 12 is prolonged and the electric current that can be supplied from the high voltage battery 12 is reduced, the present invention is advantageous in terms of ensuring the responsiveness of the driving torque to an operation performed on the accelerator pedal.

Note that in the present embodiment, the motor coil threshold temperature Tr is set in consideration of the following three parameters: the temperature TB of the high voltage battery 12, the state of charge (SOC) of the high voltage battery 12, and the continuous energization time of the high voltage battery 12.

Alternatively, the motor coil threshold temperature Tr may be set in consideration of at least one or two of the three parameters, or the motor coil threshold temperature Tr may be set without consideration of the three parameters.

However, when the motor coil threshold temperature Tr is set in consideration of the three parameters as in the present embodiment, the motor coil threshold temperature Tr can be set appropriately in accordance with the electric current that can be supplied from the high voltage battery 12; accordingly, the present invention is further advantageous in terms of ensuring the responsiveness of the driving torque to an operation performed on the accelerator pedal.

In the present embodiment, the temperature of the coil is detected by the motor coil temperature sensor (temperature detector) and used in the control. However, the invention is not limited to this configuration. Instead of the temperature of the coil, in the invention, a temperature of an element other then the coil in the motor or a temperature of the motor may be detected.

According to an aspect of the invention, when the electric motor coil temperature is equal to or lower than the threshold temperature, the engine is started based on the accelerator pedal pressing speed; thus, the electric current generated by the generator is added at an early stage to the electric current supplied to the electric motor from the battery. Further, when the electric motor coil temperature is higher than the threshold temperature, the engine is started based on the value of the electric current supplied to the electric motor from the battery; thus, the electric current generated by the generator is added to the electric current supplied to the electric motor from the battery, and the resulting electric current is supplied to the electric motor. Accordingly, the engine will not be unnecessarily started while responsiveness of driving torque to an operation performed on an accelerator pedal is improved, and therefore, fuel efficiency can be enhanced.

According to an aspect of the invention, as the temperature of the battery is reduced, the engine can be started earlier. Thus, even in a situation where the temperature of the battery is reduced and the electric current that can be supplied from the battery is reduced, the present invention is advantageous in terms of ensuring the responsiveness of driving torque to an operation performed on the accelerator pedal.

According to an aspect of the invention, as the state of charge (SOC) of the battery is reduced, the engine can be started earlier. Thus, even in a situation where the state of charge (SOC) of the battery is reduced and the electric current that can be supplied from the battery is reduced, the present invention is advantageous in terms of ensuring the responsiveness of driving torque to an operation performed on the accelerator pedal.

According to an aspect of the invention, as the continuous energization time of the battery is prolonged, the engine can be started earlier. Thus, even in a situation where the continuous energization time of the battery is prolonged and the electric current that can be supplied from the battery is reduced, the present invention is advantageous in terms of ensuring the responsiveness of driving torque to an operation performed on the accelerator pedal.

What is claimed is:

1. A control apparatus for a hybrid electric vehicle including:
an electric motor configured to drive a driving wheel of the hybrid electric vehicle; a battery configured to supply an electric current to the electric motor; a generator, provided separately from the electric motor, configured to supply an electric current to the electric motor; an engine that drives the generator to generate electric power; and a clutch through which a driving force of the engine is provided to the driving wheel in an engaged state and provided to the generator in a disengaged state, the control apparatus comprising:
a temperature detector configured to detect a motor temperature of the electric motor;
a pressing speed detector configured to detect a pressing speed of an accelerator pedal;
an electric current detector configured to detect a value of the electric current supplied to the electric motor from the battery; and
an engine controller configured to perform,
(a) determination of whether the detected motor temperature is equal to or lower than a threshold temperature or higher than the threshold temperature,
(b) contingent upon the detected motor temperature being equal to or lower than the threshold temperature, determination of whether the detected pressing speed of the accelerator pedal is equal to or higher than a threshold speed, and at a moment the detected pressing speed of the accelerator pedal becomes equal to or higher than the threshold speed, starting the engine in a state where the clutch is in the disengaged state to cause the generator to start generating the electric power to reduce the electric current supplied to the electric motor from the battery to suppress a rush current flowing into the electric motor from the battery, and
(c) contingent upon the detected motor temperature being higher than the threshold temperature, determination of whether the detected value of the electric current is equal to or higher than a threshold current, and at a moment the detected value of the electric current becomes equal to or higher than the threshold current, starting the engine so that the generator generates the electric power, wherein
the generator is constantly connected to the engine, and the clutch is provided between the engine and the motor.

2. The control apparatus according to claim 1, further comprising:
a threshold temperature setter configured to set the threshold temperature so that the lower a temperature of the battery, the lower the threshold temperature.

3. The control apparatus according to claim 1, further comprising:
a threshold temperature setter configured to set the threshold temperature so that the lower a state of charge of the battery, the lower the threshold temperature.

4. The control apparatus according to claim 1, further comprising:
a threshold temperature setter configured to set the threshold temperature so that the longer a continuous energization time that is a period of time during which the electric current is continuously supplied to the electric motor from the battery, the lower the threshold temperature.

5. The control apparatus according to claim 1, wherein the motor temperature includes a temperature of a coil of the electric motor.

6. The control apparatus according to claim 1, wherein the detected pressing speed of the accelerator pedal becoming equal to or higher than the threshold speed is indicative of a driver's intention for a sudden acceleration of the vehicle.

7. A control apparatus for a hybrid electric vehicle including: an electric motor configured to drive a driving wheel of the hybrid electric vehicle; a battery configured to supply an electric current to the electric motor; a generator, provided separately from the electric motor, configured to supply an electric current to the electric motor; an engine that drives the generator to generate electric power; and a clutch through which a driving force of the engine is provided to the driving wheel in an engaged state and provided to the generator in a disengaged state, the control apparatus comprising:
a temperature detector configured to detect a motor temperature of the electric motor;
a pressing speed detector configured to detect a pressing speed of an accelerator pedal;
an electric current detector configured to detect a value of the electric current supplied to the electric motor from the battery;
a threshold temperature setter configured to set a threshold temperature so that the lower a temperature of the battery, the lower the threshold temperature; and
an engine controller configured to perform,
(a) determination of whether the detected motor temperature is equal to or lower than the threshold temperature or higher than the threshold temperature,
(b) contingent upon the detected motor temperature being equal to or lower than the threshold temperature, determination of whether the detected pressing speed of the accelerator pedal is equal to or higher than a threshold speed, and at a moment the detected pressing speed of the accelerator pedal becomes equal to or higher than the threshold speed, starting the engine in a state where the clutch is in the disengaged state so that the generator generates the electric power to reduce the electric current supplied to the electric motor from the battery to suppress a rush current flowing into the electric motor from the battery, and
(c) contingent upon the detected motor temperature being higher than the threshold temperature, determination of whether the detected value of the electric current is equal to or higher than a threshold current, and at a moment the detected value of the electric current becomes equal to or higher than the threshold current, starting the engine so that the generator generates the electric power, wherein
the generator is constantly connected to the engine, and the clutch is provided between the engine and the motor.

* * * * *